Patented Apr. 30, 1940

2,198,592

UNITED STATES PATENT OFFICE 2,198,592

METHOD OF CONDITIONING SUPERPHOSPHATE

Johnson Hagood, Bartow, Fla., assignor to Southern Phosphate Corporation, Bartow, Fla., a corporation of Delaware No Drawing. Application August 7, 1936, Serial No. 94,874

2 Claims. (Cl. 71—43)

The present invention relates to the conditioning of superphosphate and to the production of a fertilizer therefrom.

A neutral fertilizer formed by mixing ingredients to provide a balanced ratio of plant food, such as phosphorus, potassium, and nitrogen has long been sought. It is well-known that the phosphorous content may be supplied in the form of phosphorous pentoxide in superphosphate, but superphosphate has undesirable properties, such as lack of drillability, and a free acid content that very seriously impairs its value as an ingredient.

It is common practice to ammoniate superphosphate by subjecting it to ammonia gas under pressure, but this process results in a partial reversion of the phosphorous pentoxide so that there is a loss in available phosphorous content. Furthermore the elaborate apparatus necessary renders the process quite expensive.

The herein disclosed process is not an ammoniation process although it takes advantage of the action of ammonia gas upon superphosphate to produce an improved product.

One object of the invention is to provide an inexpensive novel method of conditioning superphosphate to change its physical properties so that it will have improved drillability.

Another object is to provide a process for producing a mixed fertilizer containing available phosphorous pentoxide ($P_2O_5$) supplied by superphosphate, and which will have desirable physical properties.

Still another object is the manufacture of a neutral fertilizer.

Preferably in carrying out the invention a mixture of a mineral ammonium salt, such as ammonium sulfate ($(NH_4)_2SO_4$ or diammonium phosphate ($(NH_4)_2HPO_4$ and calcined phosphate is prepared. It is well-known that when calcined phosphate comes into intimate contact with either of these salts, ammonia gas is evolved. Immediately upon completion of the mixture, a blanket of superphosphate is thrown over it, and allowed to stand for several hours, or preferably overnight. After a period of standing sufficient to allow the superphosphate to absorb the evolved ammonia, the mixed fertilizer will be found to have become conditioned, whereby it becomes easily drillable. The ammonia neutralizes the free acid of the superphosphate and gives the very much desired neutral product.

A mixed fertilizer may be prepared by including the desired ingredients in the mix. By way of example, two thousand pounds of a fertilizer in the ratio of eight percent available phosphorous pentoxide, three percent available nitrogen and five percent available potassium oxide may be prepared as follows:

From one hundred and fifty to three hundred pounds of calcined phosphate, depending upon the superphosphate to be used, three hundred pounds of ammonium sulphate, $(NH_4)_2SO_4$, and two hundred pounds potassium chloride may be mixed by a rapid agitation. The agitation must be as rapid as possible to prevent the loss of ammonia evolved as a result of the mixture. Upon completion of the mix, a blanket composed of 681 pounds of superphosphate is immediately placed over the mixture and allowed to stand for several hours or overnight. This blanket is of such thickness that the superphosphate comprising it will be satisfactorily conditioned, but also such that no appreciable amount of ammonia will be wasted. After the conditioning period the entire batch is introduced in a mixer, 669 pounds of filler added, and the batch subjected to thorough mixing, after which it is ready to be sacked for market.

Although the blanketing method is the preferable way of treating the superphosphate, it is obvious that all of the ingredients, including the superphosphate, may be mixed together simultaneously in any suitable manner, provided that the mixing is quickly accomplished to prevent waste of ammonia, and consequent incomplete conditioning of parts of the superphosphate, the quantity of which is proportioned to the quantity of ammonia gas evolved.

Fertilizer produced in this manner is a very satisfactory product. It is completely neutral and will not attack jute sacks in which it is placed. It is dry and therefore drillable. The ratio of the different plant foods may be varied to meet different requirements.

Inasmuch as superphosphate varies as to its contents of free acid, and mono-calcium and tri-calcium phosphates, the amount of ammonia necessary to condition it varies with different lots.

The proportions of a mix that will contain the amount of calcined phosphate necessary to drive off enough ammonia to condition a given amount of any particular superphosphate may be easily determined by experiment as follows:

Ammonium salt and calcined phosphate are mixed, and placed in a container and immediately covered with a proportionate amount of superphosphate. The complete batch is allowed to stand for several hours or overnight and then shaken to mix thoroughly. The qualities of the mixture then may be determined and if not found to be satisfactory, an adjustment may be made by changing the proportion of calcined phosphate. The physical qualities of a superphosphate conditioned in this manner may be varied considerably by varying the quantity of ammonia absorbed by it, and the quantity of ammonia evolved from a given quantity of an ammonium salt may be varied by changing the proportion of calcined phosphate with which it is mixed.

The foregoing description is for the purpose of illustration and not of limitations; and it is my intention that the invention be limited only by the appended claims or their equivalents, in which I have intended to claim broadly all inherent novelty.

What I claim is:

1. The process of conditioning superphosphate that comprises preparing a mixture of a calcined phosphate and a mineral ammonium salt, whereby ammonia is evolved, and immediately covering the mixture with a blanket of superphosphate, whereby the superphosphate is conditioned by the evolved ammonia.

2. The process of preparing a mixed fertilizer that comprises making a batch by preparing a mixture of a calcined phosphate and a mineral ammonium salt, immediately covering the mixture with a blanket of superphosphate, allowing the so-covered mixture to stand for several hours, and thereafter thoroughly mixing the batch.

JOHNSON HAGOOD.